United States Patent
Lorg et al.

(10) Patent No.: US 8,160,507 B2
(45) Date of Patent: Apr. 17, 2012

(54) TRANSCEIVER SINGLE CABLE PROTOCOL SYSTEM AND METHOD

(75) Inventors: Shawn M. Lorg, Chandler, AZ (US); Kenneth V Buer, Gilbert, AZ (US); Mike Noji, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 182 days.

(21) Appl. No.: 12/729,463

(22) Filed: Mar. 23, 2010

(65) Prior Publication Data

US 2011/0235572 A1    Sep. 29, 2011

(51) Int. Cl.
    *H04B 1/38*    (2006.01)
(52) U.S. Cl. .......................................... 455/73; 375/219
(58) Field of Classification Search ................ 455/73, 455/66.1; 375/219
    See application file for complete search history.

(56) References Cited

U.S. PATENT DOCUMENTS

| | | | |
|---|---|---|---|
| 5,987,060 A | 11/1999 | Grenon et al. | |
| 6,396,844 B1 | 5/2002 | Mack et al. | |
| 6,999,584 B1 * | 2/2006 | Bogard | 379/428.01 |
| 7,050,765 B2 | 5/2006 | Ammar et al. | |
| 7,558,553 B1 | 7/2009 | Raissinia et al. | |
| 2002/0065052 A1 | 5/2002 | Pande et al. | |
| 2003/0055590 A1 | 3/2003 | Park et al. | |
| 2003/0152140 A1 * | 8/2003 | Antoniak | 375/219 |
| 2004/0203337 A1 | 10/2004 | Ammar | |
| 2004/0229562 A1 | 11/2004 | Wren et al. | |
| 2007/0237242 A1 | 10/2007 | Gjertsen | |

OTHER PUBLICATIONS

Office Action dated Jun. 21, 2010 in U.S. Appl. No. 11/876,501.
Final Office Action dated Nov. 10, 2010 in U.S. Appl. No. 11/876,501.
Advisory Action dated Jan. 21, 2011 in U.S. Appl. No. 11/876,501.
Office Action dated Apr. 6, 2011 in U.S. Appl. No. 11/876,501.
Extended European Search Report dated Jul. 14, 2011 in European Application No. 11154724.6.
Final Office Action dated Aug. 4, 2011 in U.S. Appl. No. 11/876,501.
Office Action dated Oct. 13, 2011 in U.S. Appl. No. 11/876,501.

* cited by examiner

*Primary Examiner* — Lewis West
(74) *Attorney, Agent, or Firm* — Snell & Wilmer L.L.P.

(57) ABSTRACT

A single-cable protocol and associated methods and systems enable improved communication efficiency and/or reduced cost. Transmit information, receive information, telemetry information, and/or DC power may be multiplexed onto a single cable, eliminating the need for multiple cables between a satellite transceiver and a corresponding modem while reducing and/or eliminating spurious emissions. Additionally, telemetry features enable improved diagnostics and/or repair of communication systems, for example satellite communication systems.

21 Claims, 5 Drawing Sheets

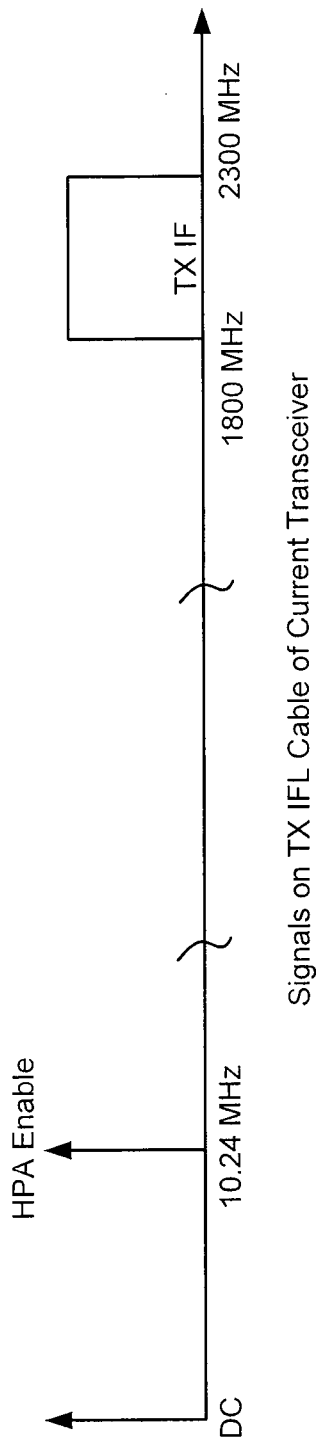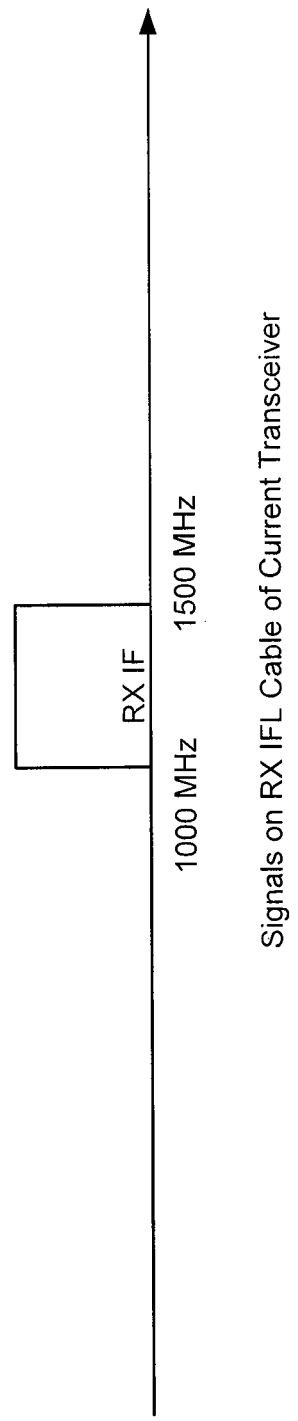
FIG. 1A
FIG. 1B

TRANSCEIVER SINGLE CABLE PROTOCOL SYSTEM AND METHOD

TECHNICAL FIELD

The present disclosure relates to communications protocols, particularly protocols utilized in connection with satellite communications.

BACKGROUND

Commonly, outdoor transceivers utilized for satellite communications connect to indoor electronics via multiple cables, for example two coaxial cables. One cable is utilized for receiving signals from the satellite via the transceiver, and the other cable is utilized for transmitting signals to the satellite via the transceiver. Additionally, such outdoor transceivers are often configured with very limited command and control protocols, for example protocols configured simply to enable and disable the transmit high-power amplifier (HPA). However, there is a growing need to provide more complex command and control protocols. Additionally, it is desirable to provide access to additional information associated with the state and/or health of a transceiver. It would therefore be desirable to provide transmit, receive, command and control, and/or DC power onto a single physical cable.

SUMMARY

This disclosure relates to systems and methods for communication via a single cable. In an exemplary embodiment, a method for multiplexing data communications comprises communicating to a modem, via an intermediate frequency cable coupled to a transceiver, data over a first frequency range; and receiving at the transceiver, via the intermediate frequency cable, data communicated from the modem over a second frequency range. The first frequency range and the second frequency range are separated by at least one octave.

In another exemplary embodiment, a method for multiplexing data communications comprises receiving, via an intermediate frequency cable coupled to a modem, data communicated from a transceiver over a first frequency range; and communicating to the transceiver, via the intermediate frequency cable, data over a second frequency range. The first frequency range and the second frequency range are separated by at least one octave.

In yet another exemplary embodiment, a method for multiplexing data communications comprises communicating to a modem, via an intermediate frequency cable coupled to a transceiver, data over a first frequency range; receiving at the transceiver, via the intermediate frequency cable, data communicated from the modem over a second frequency range. The first frequency range and the second frequency range are separated by at least one octave. The method further comprises receiving at the transceiver, via the intermediate frequency cable, a command communicated over a telemetry link; and communicating to the modem, via the intermediate frequency cable, system parameter information over the telemetry link. The intermediate frequency cable carries DC power.

In yet another exemplary embodiment, a communication system comprises a transceiver and a modem coupled to the transceiver via a single intermediate frequency cable. The intermediate frequency cable carries data sent from the transceiver to the modem over a first frequency range. The intermediate frequency cable carries data sent from the modem to the transceiver over a second frequency range. The first frequency range and the second frequency range are separated by at least one octave.

In yet another exemplary embodiment, an article of manufacture includes a computer-readable medium having instructions stored thereon that, if executed by a transceiver, cause the transceiver to perform operations comprising communicating to a modem, via an intermediate frequency cable coupled to the transceiver, data over a first frequency range; and receiving at the transceiver, via the intermediate frequency cable, data communicated from the modem over a second frequency range. The first frequency range and the second frequency range are separated by at least one octave.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 1A illustrates signals on a transmit cable of a communication system as known in the art;

FIG. 1B illustrates signals on a receive cable of a communication system as known in the art;

DETAILED DESCRIPTION

Figure 1C:
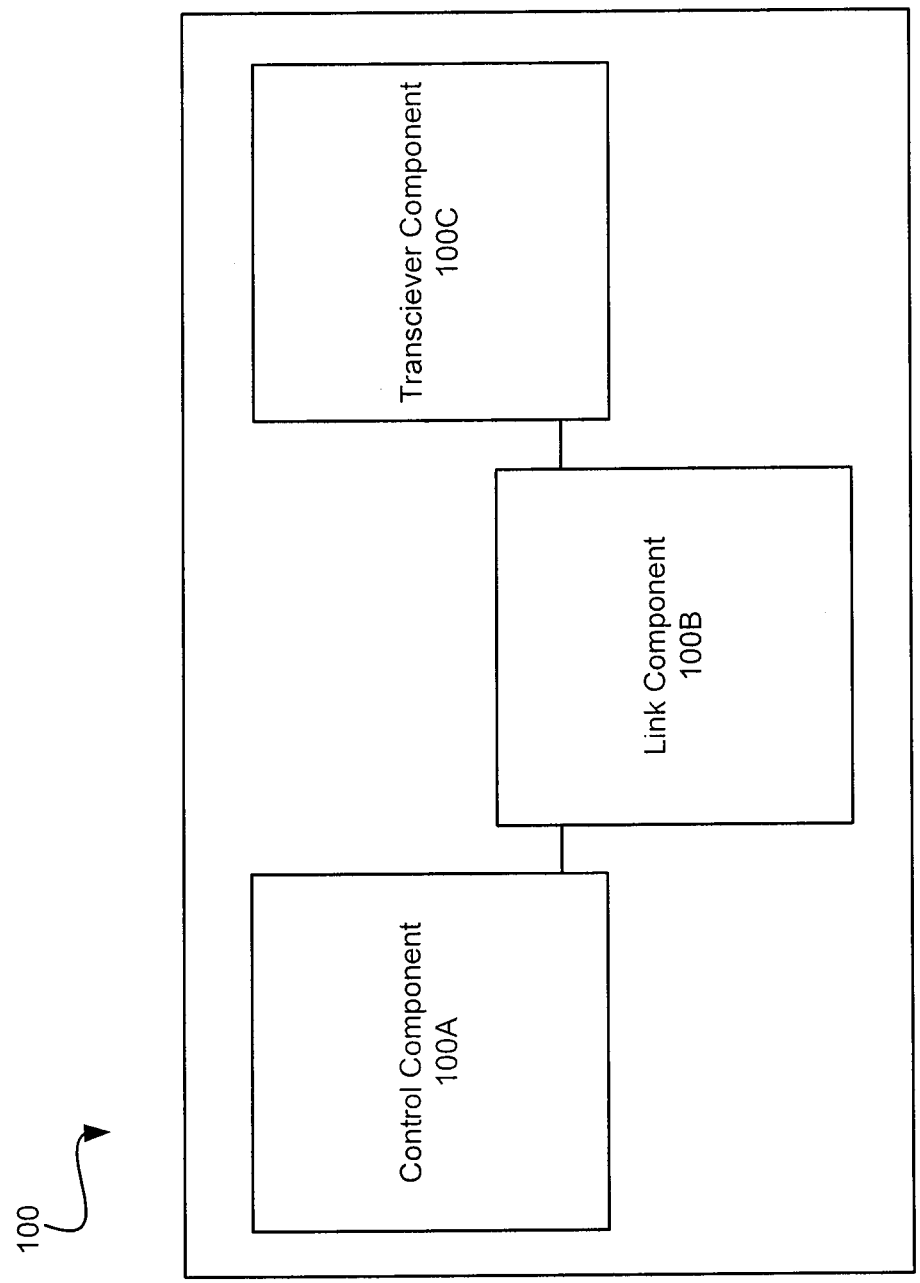
FIG. 1C illustrates a block diagram of a communication system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for satellite communication, communication protocols, signal processing, networking, filtering, and/or the like may not be described in detail herein. Furthermore, the connecting lines shown in various figures contained herein are intended to represent exemplary functional relationships and/or physical and/or communicative couplings between various elements. It should be noted that many alternative or additional functional relationships, physical connections, and/or communicative relationships may be present in a practical communication system, for example a satellite communication system configured according to a single-cable protocol.

For purposes of convenience, the following definitions may be used in this disclosure:

HPA—high power amplifier.
IF—intermediate frequency.
IFL—intermediate frequency link.

OOK—on-off keyed, where on-off keying represents a form of amplitude-shift keying modulation wherein digital data may be represented by the presence or absence of a carrier wave.

RX—receive.

TX—transmit.

Single-cable—refers to a common physical signal path configured to carry two or more signals, as opposed to "multiple cable" where at least two signals do not have a common physical signal path.

As satellite communication system bandwidths increase, and as polarization diversity-based frequency reuse is employed, there is an increasing desire to be able to tune the transceiver to different bands and/or modify polarizations via command protocols of increased complexity. Additionally, the ability to extract information from the transceiver (for example, information associated with the health of a transceiver, and the like) can allow a set-top box, modem, or other associated electronics to detect, diagnose, and/or correct fault conditions that may otherwise require a visit from a service technician.

In prior satellite communications systems, multiple-cable architectures are common, generally with one cable exclusively for TX and one cable exclusively for RX. Typically, this is because the intermediate frequencies utilized within the satellite communications system for transmit, receive, and/or telemetry are comparatively close together. Thus, placing these signals on a single cable can result in significant interference. Moreover, a significant amount of filtering may be needed in order to achieve suitable frequency separation. This filtering may require too many poles and/or take up too much area on the available electronics to be practical and/or feasible. For example, in order to prevent a received signal from being re-transmitted as a spurious emission, the transmit side of a multiplexor on a transceiver often needs to have a suitably high level of rejection at the receive frequencies, for example at least 70 decibels (dB) of rejection at the receive frequencies. Current transceivers commonly utilize an RX IF band of between about 1.0 to about 1.5 GHz and a TX IF band of between about 1.8 GHz to about 2.3 GHz. Thus, in various current transceivers, only approximately 300 MHz of separation between the TX and RX bands exists. In these transceivers, the amount of filtering needed to obtain 70 dB of rejection between these bands may be prohibitive.

In contrast, improved communication system configurability, simplified electronics, reduced system expense, and/or the like may desirably be achieved via use of a communications system according to the present disclosure, for example a communication system configured with a single-cable protocol wherein transmit, receive, and telemetry data are all multiplexed onto a single physical cable.

A communication system, for example a communication system configured according to a single-cable protocol, may be any system configured to facilitate communications between a transceiver and a modem or other control electronics. In accordance with an exemplary embodiment, and with reference to FIG. 1C, a communication system 100 generally comprises a control component 100A, a link component 100B, and a transceiver component 100C. Control component 100A is configured to control operation of communication system 100, for example processing incoming communications received at transceiver component 100C, selecting communications for transmission via transceiver component 100C, issuing control commands to transceiver component 100C, and/or the like. In an exemplary embodiment, control component 100A is a modem. In other exemplary embodiments, control component 100A may be any suitable hardware configured to at least partially control operation of communication system 100.

Link component 100B is coupled to control component 100A and to transceiver component 100C. In an exemplary embodiment, link component 100B is configured to facilitate communication between control component 100A and transceiver component 100C. In various exemplary embodiments, link component 100B comprises coaxial cable. In other exemplary embodiments, link component 100B comprises multiple coaxial cables and/or connectors arranged in a serial manner. Moreover, link component 100B may comprise any suitable wire, cable, and/or other physical signal path configured to facilitate communication between control component 100A and transceiver component 100C. Additionally, link component 100B may be configured to facilitate communication between multiple control components 100A and/or transceiver components 1000, for example via use of a multiplexer at one or more ends of link component 100B.

Transceiver component 100C is configured to receive information intended for delivery to control component 100A. In an exemplary embodiment, transceiver component 100C is configured to receive information transmitted from a satellite. In other exemplary embodiments, transceiver component 100C is configured to receive information transmitted by a terrestrial source (e.g., point to point). Transceiver component 100C is also configured to transmit information received from control component 100A. In various exemplary embodiments, transceiver component 100C is configured to transmit information to a satellite, a terrestrial target, and/or a combination of the same. In an exemplary embodiment, transceiver component 100C comprises Viasat model number USM-TXR-KA01-F-01-110. Moreover, transceiver component 100C is configured to respond to operative commands issued by control component 100A. In yet further exemplary embodiments, transceiver component 100C is configured to report information to control component 100A.

In various exemplary embodiments, only one cable is used for all communications between control component 100A and transceiver component 100C.

Figure 2A:
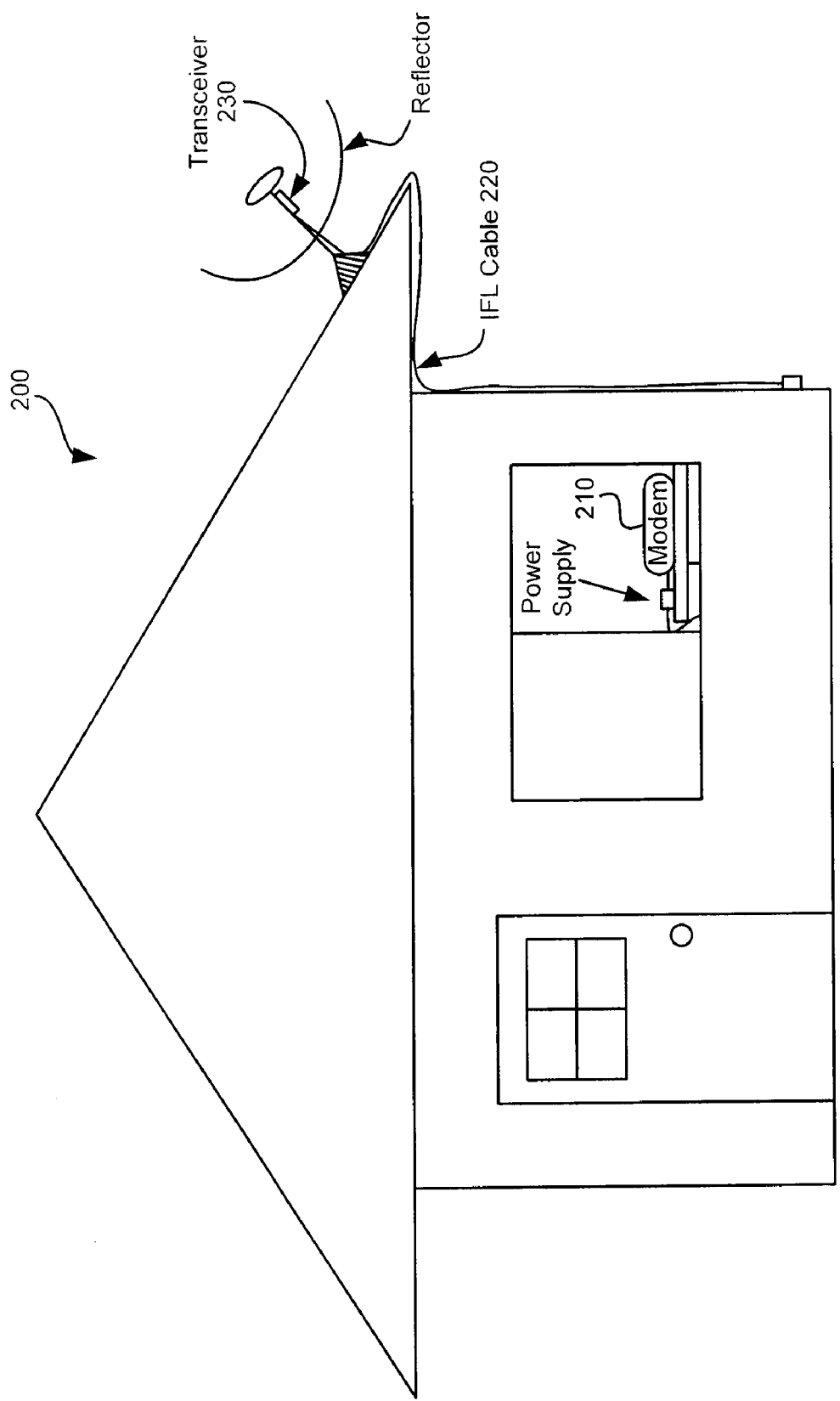
FIG. 2A illustrates a communication system configured according to a single-cable protocol in accordance with an exemplary embodiment.

With reference now to FIG. 2A, and in accordance with an exemplary embodiment, a communications system 100 (for example, satellite communication system 200) comprises a control component 100A (for example, modem 210), a link component 100B (for example, IFL cable 220), and a transceiver component 100C (for example, transceiver 230). In contrast to prior approaches using multiple, parallel physical cables for communication, in accordance with various exemplary embodiments, satellite communications system 200 is configured to route all communication between modem 210 and transceiver 230 via a single physical cable (i.e., via a single physical signal path), for example IFL cable 220.

In an exemplary embodiment, with further reference to FIG. 2B, communications between modem 210 and transceiver 230 are configured to take place via a single physical cable as follows:

The RX IF signal of FIG. 1B, previously operative in a frequency range between about 1000 MHz to about 1500 MHz, is shifted down the spectrum to a new frequency range between about 300 MHz to about 800 MHz. The TX IF of FIG. 1A is kept at about 1800 MHz to about 2300 MHz. In this manner, an increased frequency separation of about 1 GHz between the RX IF and the TX IF is achieved. In other examples, various frequencies operative within communications system 100 may be configured to have frequency separation of an octave, a decade, or even larger frequency separation from one another. Moreover, various frequencies operative within communications system 100 may be configured to have an octave or more of frequency separation from certain interfering signals, for example power supply switching spurs, PLL reference spurs, and/or the like. In certain exemplary embodiments, inter-modulation and mixing products from various signal sources may be analyzed in order to configure communications system 100 such that combinations of certain signals do not significantly interfere with each other.

By configuring communications system 100 with suitable frequency separation, significantly reduced filtering can achieve a suitable level of rejection (e.g., 70 dB or more) between the RX IF and the TX IF bands, as compared to the filtering required to achieve a suitable level of rejection when the RX IF and TX IF bands are closer together. Furthermore, principles of the present disclosure contemplate any system, component, mechanism, and/or the like that shifts the RX signal to a new frequency range in order to combine the RX signal with other signals on a single cable. Moreover, by utilizing a single cable for both TX and RX, expenses associated with manufacturing, installation, and use of satellite communication system 200 are reduced compared to multiple cable systems.

In various exemplary embodiments, the HPA enable signal of FIG. 1A and/or other similar HPA enable signals are eliminated. This HPA enable signal, operative at about 10.24 MHz, merely turned the high power amplifier on and off. In these exemplary embodiments, the HPA enable signal may be replaced with command carrier signal 250, for example command carrier signal 250 operative at about 10 MHz. Furthermore, IFL cable 220 may be configured to carry a status carrier signal 260. In one example, status carrier signal 260 is operative at about 12.5 MHz. Moreover, command carrier signal 250 and/or status carrier signal 260 may be operative over any suitable frequencies and/or comprise any suitable encoding, modulation schemes, and/or the like, as desired. Additionally, IFL cable 220 may be configured to carry additional signals and/or communications between modem 210 and transceiver 230, as desired. In this manner, improved command, control, and/or diagnostic functionality of satellite communication system 200 may be achieved, because a wider variety of data regarding transceiver 230 is available to modem 210, and a wider variety of commands may be send to transceiver 230.

For example, in various exemplary embodiments modem 210 may issue various commands, for example configuration and control commands, to transceiver 230. Transceiver 230 may communicate various data, for example configuration and diagnostic data, to modem 210. For example, transceiver 230 may communicate certain data to modem 210 responsive to a command from modem 210. Additionally, transceiver 230 may communicate certain data to modem 210 without receiving a command from modem 210. Consequently, satellite communication system 200 set-up and/or maintenance are vastly simplified. For example, error codes associated with a particular transceiver 230 may be retrieved by modem 210 and delivered to a remote system for assessment. In particular, various problems associated with transceiver 230 may be remotely diagnosed and/or remedied, often without requiring a visit from a service technician. In contrast, many prior systems lack the ability to retrieve operational information from the transceiver, leading to a service visit in order to obtain the desired diagnostic information.

Additionally, portions of satellite communication system 200 may be configured to be backwards-compatible with various existing communications systems. For example, a particular modem 210 may be configured to utilize a single-cable protocol when coupled to a particular transceiver 230 supporting a single-cable protocol. This modem 210 may also be configured to utilize a multiple-cable protocol when coupled to another transceiver 230 supporting only a multiple-cable protocol. Similarly, a particular transceiver 230 may be configured to utilize a single-cable protocol when coupled to a particular modem 210 supporting a single-cable protocol. This transceiver 230 may also be configured to utilize a multiple-cable protocol when coupled to a particular modem 210 supporting only a multiple-cable protocol. Thus, satellite communication system 200 achieves reduced system creation and/or installation expenses by facilitating re-use of existing components, as desired.

For example, in an exemplary embodiment, modem 210 is configured to determine the number of cables coupling modem 210 and transceiver 230. If a single cable couples modem 210 and transceiver 230, modem 210 may send a command to transceiver 230 via the single cable. Transceiver 230 may reply to modem 210 over the single cable. Transceiver 230 and modem 210 may thus authenticate one another via a suitable authentication protocol as known in the art.

Additionally, transceiver 230 and/or modem 210 may be configured to enable and/or disable portions thereof depending on the number of cables coupling modem 210 and transceiver 230. For example, a particular transceiver 230 may have two ports where a cable may attach. In one scenario, when only the first port is coupled to a cable and thus coupled to a particular modem 210, transceiver 230 may be configured to disable the second port and thus direct all communications through the first port. In another scenario, when the first port and the second port are coupled to cables and thus to a particular modem 210, transceiver 230 may be configured to direct certain communications and/or signals (for example, RX and command and control) through the first port, and to direct certain other communications and/or signals (for example, TX and DC) through the second port. To be clear, various combinations of communications and/or signals may be implemented (for example: TX, command and control, and DC through the first port, RX through the second port; TX, RX, and DC through the first port, command and control through the second port; TX, RX, DC, and command and control through the first port, no signals through the second port; and so on), and the examples discussed are merely by way of illustration and not of limitation.

In various exemplary embodiments, satellite communication system 200 comprises modem 210. Modem 210 may comprise any components and/or circuitry configured to facilitate operation of satellite communication system 200. In various exemplary embodiments, modem 210 comprises a satellite modem configured to be compatible with one or more of: Digital Video Broadcasting-Satellite-Second Generation (DVB-S2) standards, Worldwide Interoperability for Microwave Access (WiMAX) standards, Data Over Cable Service Interface Specification (DOCSIS) standards, and/or the like. Modem 210 is configured to couple to other electronic systems, for example a personal computer. Modem 210 may also be configured to couple to other electronic systems via any suitable method, for example via an Ethernet connection, via a Universal Serial Bus (USB) connection, and/or the like.

In various exemplary embodiments, modem 210 is configured to receive information from a network via transceiver 230. Modem 210 may be configured to process, transcode, upconvert, downconvert, and/or otherwise modify and/or format the information. Modem 210 is also configured to transmit the information to a personal computer. Modem 210 is further configured to receive information from a personal computer, and transmit the information to a network via transceiver 230. Additionally, modem 210 may be configured to implement various other functionality, for example diagnostic capabilities associated with one or more transceivers 230, remote monitoring capabilities for one or more transceivers 230, and/or the like. Moreover, modem 210 may comprise any suitable hardware, firmware, processors, memories, and/or the like, as desired, in order to implement various features of satellite communication system 200.

In various exemplary embodiments, modem 210 is coupled to transceiver 230 via IFL cable 220. In an exemplary embodiment, when receiving data from transceiver 230, modem 210 downconverts the data to a baseband frequency, demodulates the data, and outputs the data in a desired format, for example a format suitable for interpretation by a personal computer. Moreover, modem 210 may be configured to shift, downconvert, and/or otherwise modify data from transceiver 230. Additionally, modem 210 may be configured to receive data received from transceiver 230 at different frequencies, for example via use of a different local oscillator for data received at different frequencies, via use of a tunable local oscillator, and/or the like.

In another exemplary embodiment, when transmitting data to transceiver 230, modem 210 modulates the data and upconverts the data into a desired communication channel, for example a communication channel located between about 1800 MHz and about 2300 MHz. Additionally, modem 210 may be configured to transmit data to transceiver 230 at different frequencies, for example via use of a different local oscillator for data transmitted at different frequencies, via use of a tunable local oscillator, and/or the like. In this manner, modem 210 may be utilized in connection with various transceivers 230 operative at various TX and RX frequencies.

Moreover, modem 210 may upconvert, downconvert, encode, decode, encrypt, decrypt, compress, decompress, and/or otherwise process and/or modify data, as desired. In various exemplary embodiments, modem 210 is coupled to transceiver 230 via IFL cable 220.

Figure 3:
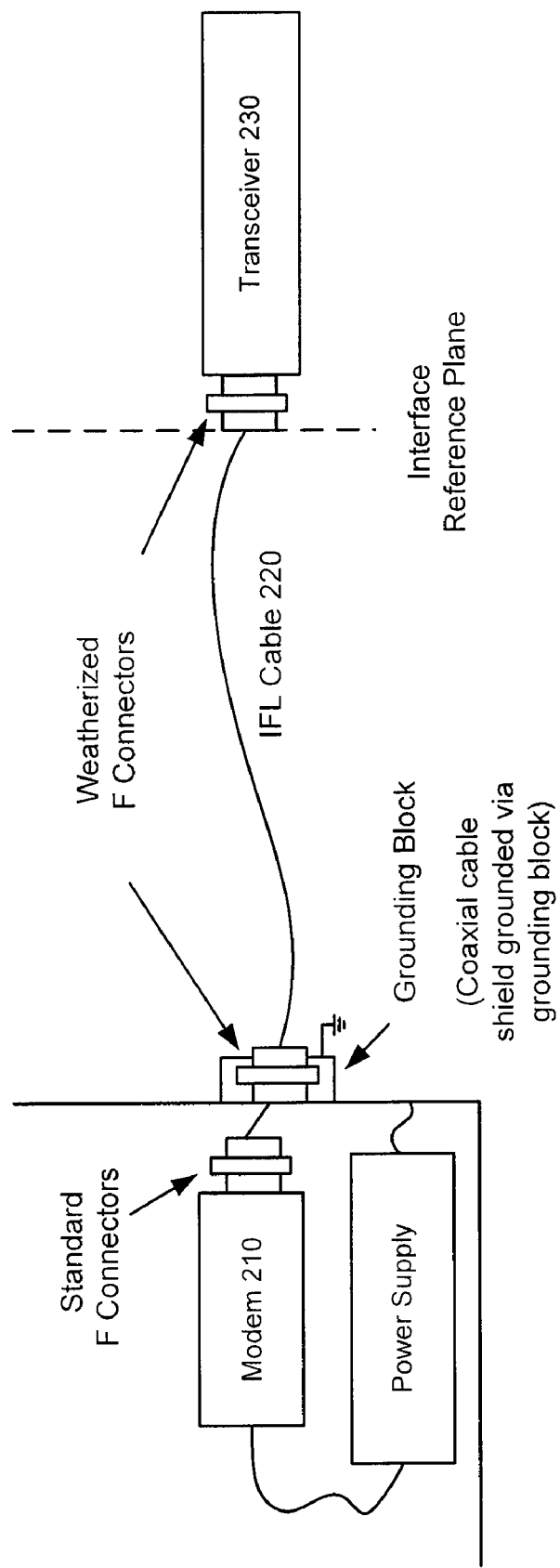
FIG. 3 illustrates a communication system configured according to a single-cable protocol in accordance with an exemplary embodiment.

IFL cable 220 may comprise any wire, link, connector, and/or other component and/or circuitry configured to couple modem 210 to transceiver 230. In an exemplary embodiment, IFL cable 220 comprises a coaxial cable suitable for transmission of radio frequency (RF) signals, for example RF signals between about 1 kHz and 3 GHz. Moreover, IFL cable 220 may comprise multiple serial cable segments and/or connectors, as desired. For example, with momentary reference to FIG. 3, portions of IFL cable 220 located outdoors, for example between transceiver 230 and a grounding block, may be configured with connectors suitable to couple to weatherized "female outdoor" F connectors in accordance with ANSI/SCTE 02 1997. Similarly, portions of IFL cable 220 located indoors, for example between modem 210 and a grounding block, may be configured with connectors suitable to couple to "female indoor" F connectors in accordance with ANSI/SCTE 01 1996R2001. Moreover, IFL cable 220 may comprise any suitable cable, wire, link, connectors and/or other components configured to transmit information, for example at RF frequencies as disclosed above.

In certain exemplary embodiments, IFL cable 220 comprises a single physical signal path. Stated another way, IFL cable 220 may also comprise a various components (e.g., metal wires, connectors, and/or the like) arranged such that communications signals present on IFL cable 220 span the length of the cable. Moreover, as previously discussed, in various embodiments satellite communication system 200 may also utilize multiple IFL cables in a parallel arrangement, for example in order to preserve backwards compatibility with legacy infrastructure.

Transceiver 230 may comprise any components and/or circuitry configured to facilitate transmission and reception of information, for example via an antenna. In an exemplary embodiment, transceiver 230 comprises a satellite transceiver configured to communicate in the $K_a$ band. In another exemplary embodiment, transceiver 230 comprises a satellite transceiver configured to communicate in the $K_u$ band. In another exemplary embodiment, transceiver 230 comprises a tunable transceiver configured to communicate in an RX band between about 17.7 GHz and about 21.2 GHz, and a TX band between about 27.5 GHz and 31.0 GHz. Moreover, transceiver 230 may be configured to be tunable across a particular RX and/or TX communication band, for example in steps of 100 MHz, 50 MHz, and/or any other suitable tuning increment. Furthermore, transceiver 230 may be configured to tune to any suitable frequency ranges. Thus, transceiver 230 may be configured to provide and/or respond to transceiver frequency tuning control signals over the same cable used for TX and RX signals.

In other exemplary embodiments, transceiver 230 comprises a transceiver configured to communicate across the multiple ranges in the $K_a$ band. Moreover, transceiver 230 may also comprise a transceiver configured to communicate in different RF bands, for example the $K_u$ band, the K band, the $K_a$ band, and/or the like and/or combinations of the same. Transceiver 230 may also comprise one or more tunable transceivers, for example 3 tunable transceivers operative at about 500 GHz. Thus, transceiver 230 may send and/or receive information in multiple bands, as desired.

Transceiver 230 may be externally mounted (for example, on a building). Transceiver 230 may also be coupled to a reflector dish as known in the art. In general, transceiver 230 may be located, mounted, configured, aligned, and/or the like, as desired in order to facilitate operation of satellite communication system 200.

Transceiver 230 may be connected in signal communication with an antenna, for example a parabolic dish antenna, a phased array antenna, and/or the like. Transceiver 230 may be coupled to and/or otherwise communicate with any suitable antenna or other signal transmitting/receiving means.

Transceiver 230 may further comprise a signal input and/or signal output. In an exemplary embodiment, the signal input and/or signal output may be connected in signal communication with modem 210 and/or the like. Communication with modem 210 may take place via IFL cable 220. Moreover, any suitable method of providing signals to and/or receiving signals from transceiver 230 may be used.

Although described herein as a transceiver, it should be understood that wherever applicable throughout this disclosure transceiver 230 may be only a transmitter or only a receiver. Generally, however, transceiver 230 may comprise any typical transceiver components suitable for communication of electronic signals, for example RF signals. In an exemplary embodiment, the transmit portion of transceiver 230 may comprise a transmit up-converter, such as a $K_a$ band block up-converter ("BUC"). In another exemplary embodiment, the receive portion of transceiver 230 may comprise a receive down-converter, such as a low noise block ("LNB") down-converter. Moreover, transceiver 230 may comprise any suitable transmitter, receiver, and/or transceiver components suitable for communication and/or processing of RF signals.

In an exemplary embodiment, transceiver 230 comprises a block upconverter having an 1800-2300 MHz input IF interface. Stated another way, in this embodiment transceiver 230 is configured to receive intermediate frequency signals from modem 210 over a frequency range from about 1800 MHz to about 2300 MHz. However, transceiver 230 may comprise a block upconverter and/or other upconverter configured to receive signals over any suitable frequency range, as desired.

In various exemplary embodiments, transceiver 230 comprises a downconvertor having a 300-800 MHz output IF interface. Stated another way, in these exemplary embodiments transceiver 230 is configured to output signals intended for delivery to modem 210 over a frequency range from about 300 MHz to about 800 MHz. However, transceiver 230 may comprise a downconvertor and/or other hardware and/or software configured to output, deliver, and/or otherwise transmit signals intended for delivery to modem 210 over any suitable frequency range, as desired.

In various exemplary embodiments, transceiver 230 communicates at full duplex with modem 210 via the input and output IF interfaces. Full-duplex communication over a single physical cable (e.g., IFL cable 220) is thus enabled. In contrast, prior systems often enabled full-duplex communication by utilizing multiple cables, or simply provided half-duplex communication over a single physical cable. In addition to full-duplex communication via IFL 220, satellite communication system 200 may be configured to provide command and control communication and/or DC power over IFL 220, as discussed below.

Transceiver 230 may be configured to be compatible with various antennas and/or the like. In an exemplary embodiment, transceiver 230 is configured to be compatible with an antenna comprising an orthomode transducer, a polarizer, and/or a feed horn. Transceiver 230 may also be configured to be compatible with an antenna having a phased array feed. In general, transceiver 230 may be configured to be compatible with any suitable antenna and/or other similar transmission or reception means.

Furthermore, as the need for increasing communication bandwidth urges operating communications systems at higher carrier frequencies, in various exemplary embodiments transceiver 230 comprises a high frequency consumer broadband transceiver. In an exemplary embodiment, transceiver 230 may transmit on the $K_a$ frequency. In various exemplary embodiments, transceiver 230 may transmit over a range from about 27.5 GHz to about 31 GHz, while receiving over a range from about 17.7 GHz to about 21.2 GHz. In general, transceiver 230 may be configured to receive and/or transmit over a suitable subset of frequencies located between about 10 GHz and about 90 GHz.

In certain exemplary embodiments, transceiver 230 is configured for broadband interne services delivered using satellites, for example satellites orbiting in geo-stationary orbits. In another exemplary embodiment, transceiver 230 is configured to be used in consumer satellite ground terminal applications.

Figure 2B:
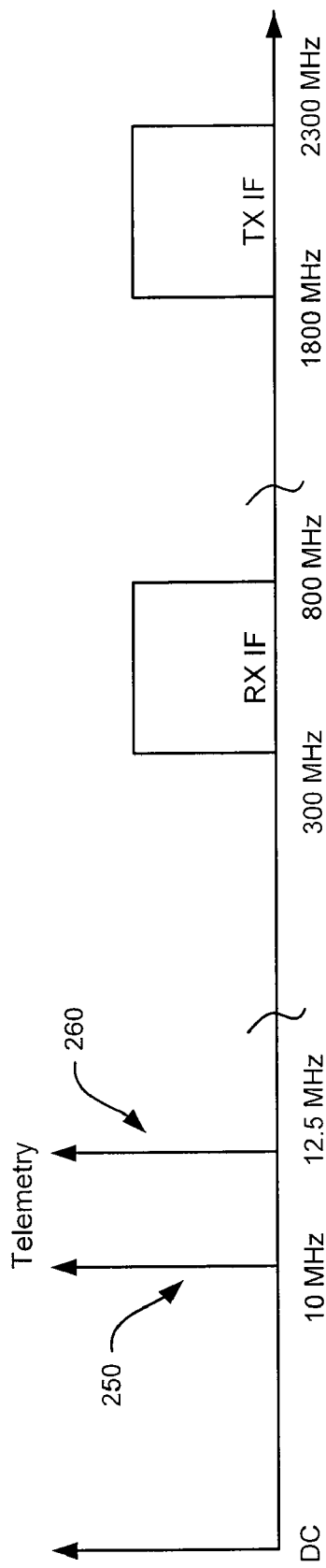
FIG. 2B illustrates various signals on a single cable of a communication system in accordance with an exemplary embodiment.

Turning now to FIG. 2B, in an exemplary embodiment commands from modem 210 to transceiver 230 are transmitted along IFL cable 220 via command carrier signal 250, for example command carrier signal 250 operative at about 10 MHz. Moreover, command carrier signal 250 may be operative at any suitable frequency and/or be configured with any suitable bandwidth, as desired.

In an exemplary embodiment, responses from transceiver 230 to modem 210 are transmitted along IFL cable 220 via status carrier signal 260, for example status carrier signal 260 operative at about 12.5 MHz. Moreover, status carrier signal 260 may be operative at any suitable frequency and/or be configured with any suitable bandwidth, as desired. In various exemplary embodiments, command carrier signal 250 and status carrier signal 260 are operative at frequencies sufficiently separated to distinguish them from one another with only a small amount of filtering. For example, in certain exemplary embodiments command carrier signal 250 and status carrier signal 260 are operative below 15 MHz and are separated by at least 2 MHz. In other exemplary embodiments, command carrier signal 250 and status carrier signal 260 are operative at frequencies at least a decade apart from RX IF signals and/or TX IF signals within communication system 100, for example at frequencies below 30 MHz. Moreover, in various exemplary embodiments, the telemetry link may be full duplex, as desired.

In other exemplary embodiments, command carrier signal 250 and status carrier signal are operative at the same frequency. In these exemplary embodiments, the telemetry link may be half duplex.

In various exemplary embodiments, in order to facilitate distinguishing a TX enable command and/or other transceiver commands, command carrier signal 250 is on-off key modulated. Additionally, status carrier signal 260 may also be on-off key modulated. However, any suitable modulation, encoding, and/or transmission scheme may be employed in order to transmit information to and/or from transceiver 230 via command carrier signal 250 and/or status carrier signal 260. In an exemplary embodiment, to reduce the risk of spurious TX emissions, commands may be sent to transceiver 230 via command carrier signal 250 during time periods that the transmitter is disabled.

In this manner, various commands and/or messages may be sent to and/or received from transceiver 230. Thus, the ability to control, diagnose, reconfigure, and/or otherwise monitor operation of transceiver 230 is improved. Additionally, because commands are sent to transceiver 230 via command carrier signal 250, and information is received from transceiver 230 via status carrier signal 260, full-duplex communication between modem 210 and transceiver 230 can be achieved. For example, status information from transceiver 230 may be returned to modem 210 simultaneously as commands are sent from modem 210. For purposes of convenience, a communicative connection between modem 210 and transceiver 230 via command carrier signal 250 and/or status carrier signal 260 (and/or other signals and/or messages, as desired) is referred to herein as a "telemetry link."

Over a telemetry link, modem 210 may issue commands to transceiver 230. For example, modem 210 may issue one or more commands to transceiver 230 in order to: enable the transmitter, change an operative frequency, control a delay between various antenna installation aid tones, change a polarization, select input and/or output power detection, inform transceiver 230 of a data rate being used, and/or the like. Modem 210 may issue any suitable command to transceiver 230 and/or transmit any suitable information to transceiver 230, as desired. Transceiver 230 may reply over the telemetry link, for example via bit sequences configured as status messages.

Moreover, modem 210 may also request the status of transceiver 230 via a telemetry link, for example in order to receive information regarding the configuration of transceiver 230 and/or the health of transceiver 230. Transceiver 230 may thus record, monitor, track, and/or otherwise store various parameters, historical data, and/or other information for later retrieval, as desired.

In an exemplary embodiment, system parameters tracked by transceiver 230 and available for reporting to modem 210 include: transceiver temperature, antenna polarity, TX band, RX band, lock faults, parity faults, cable resistance faults, watchdog timer faults, cable resistance, hours of operation, transceiver serial number, transceiver firmware information, present polarization, transceiver software information, TX IF power, RX IF power, and/or the like.

In an exemplary embodiment, when transceiver 230 is installed as part of communication system 200, modem 210 may command transceiver 230 into an "installation mode" via a telemetry link. In installation mode, transceiver 230 is configured to emit an audible tone, with a delay between tones proportional to the received signal strength. Modem 210 may determine the received signal strength based on the received signal. Modem 210 may then inform transceiver 230 of a corresponding delay to be utilized between tones. In an exemplary embodiment, as the signal to noise ratio increases, the delay between tones decreases. Transceiver 230 may also adjust the delay and return a response message to modem 210 regarding the delay used. By providing audible feedback, communication system 200 enables an installer of communication system 200 to more efficiently locate a suitable pointing angle for a reflector associated with transceiver 230.

In various exemplary embodiments, modem 210 may inform transceiver 230 of various information, for example which data rate is being used. In these exemplary embodiments, transceiver 230 may take one or more actions responsive to information from modem 210, for example selecting a suitable averaging window for use in a power detection algorithm.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing a specified function. These computer program instructions may also be stored in a computer-readable memory that can direct a computer or other programmable data processing apparatus to function in a particular manner, such that the instructions stored in the computer-readable memory produce an article of manufacture including instruction means which implement a specified function. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing a specified function.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for multiplexing data communications, the method comprising:
   communicating to a modem, via an intermediate frequency cable coupled to a transceiver, data over a first frequency range; and
   receiving at the transceiver, via the intermediate frequency cable, data communicated from the modem over a second frequency range,
   wherein the first frequency range and the second frequency range are separated by at least one octave; wherein the data communicated over the first frequency range is carried via a first intermediate frequency signal; and wherein the data communicated over the second frequency range is carried via a second intermediate frequency signal; and wherein communication of said first and second intermediate frequency signals, over the intermediate frequency cable, is full duplex.

2. The method of claim 1, further comprising receiving at the transceiver, via the intermediate frequency cable, a command from a modem communicated over a telemetry link.

3. The method of claim 2, further comprising communicating to the modem, via the intermediate frequency cable, system parameter information over the telemetry link.

4. The method of claim 3, wherein the telemetry link is operative over a telemetry frequency range separated from the first frequency range and the second frequency range by at least a decade.

5. The method of claim 1, wherein the first frequency range is from about 300 MHz to about 800 MHz, and wherein the second frequency range is from about 1800 MHz to about 2300 MHz.

6. The method of claim 3, wherein the system parameter information is associated with at least one of: transceiver temperature, antenna polarity, TX band, RX band, lock faults, parity faults, cable resistance faults, watchdog timer faults, cable resistance, hours of transceiver operation, transceiver serial number, transceiver firmware information, present polarization, transceiver software information, TX IF power, or RX IF power.

7. The method of claim 2, wherein the command is a diagnostic command.

8. The method of claim 2, wherein the command is configured to cause the transceiver to enter an installation mode.

9. The method of claim 1, wherein the intermediate frequency cable carries DC power.

10. A method for multiplexing data communications, the method comprising:
receiving, via an intermediate frequency cable coupled to a modem, data communicated from a transceiver over a first frequency range; and
communicating to the transceiver, via the intermediate frequency cable, data over a second frequency range,
wherein the first frequency range and the second frequency range are separated by at least one octave; wherein the data communicated over the first frequency range is carried via a first intermediate frequency signal; and wherein the data communicated over the second frequency range is carried via a second intermediate frequency signal; and wherein communication of said first and second intermediate frequency signals, over the intermediate frequency cable, is full duplex.

11. The method of claim 10, further comprising communicating, via the intermediate frequency cable, a command to the transceiver over a telemetry link.

12. The method of claim 10, wherein the telemetry link is operative over a telemetry frequency range separated from the first frequency range and the second frequency range by at least a decade.

13. A method for multiplexing data communications, the method comprising:
communicating to a modem, via an intermediate frequency cable coupled to a transceiver, data over a first frequency range;
receiving at the transceiver, via the intermediate frequency cable, data communicated from the modem over a second frequency range, wherein the first frequency range and the second frequency range are separated by at least one octave;
receiving at the transceiver, via the intermediate frequency cable, a command communicated over a telemetry link; and
communicating to the modem, via the intermediate frequency cable, system parameter information over the telemetry link,
wherein the intermediate frequency cable carries DC power; wherein the data communicated over the first frequency range is carried via a first intermediate frequency signal; and wherein the data communicated over the second frequency range is carried via a second intermediate frequency signal; and wherein communication of said first and second intermediate frequency signals, over the intermediate frequency cable, is full duplex.

14. The method of claim 13, wherein all communication via the intermediate frequency cable is full duplex.

15. The method of claim 13, wherein the communicating data over a first frequency range and the receiving data over a second frequency range occur simultaneously.

16. A communication system, comprising:
a transceiver; and
a modem coupled to the transceiver via a single intermediate frequency cable,
wherein the intermediate frequency cable carries data sent from the transceiver to the modem over a first frequency range,
wherein the intermediate frequency cable carries data sent from the modem to the transceiver over a second frequency range, and
wherein the first frequency range and the second frequency range are separated by at least one octave; wherein the data communicated over the first frequency range is carried via a first intermediate frequency signal; and wherein the data communicated over the second frequency range is carried via a second intermediate frequency-signal; and wherein communication of said first and second intermediate frequency signals, over the intermediate frequency cable, is full duplex.

17. The system of claim 16, wherein the intermediate frequency cable carries a telemetry link between the transceiver and the modem.

18. The system of claim 17, wherein the telemetry link is operative over a telemetry frequency range separated from the first frequency range and the second frequency range by at least a decade.

19. The system of claim 16, wherein the first frequency range is from about 300 MHz to about 800 MHz, and wherein the second frequency range is from about 1800 MHz to about 2300 MHz.

20. The system of claim 16, wherein the intermediate frequency cable carries DC power.

21. An article of manufacture including a computer-readable medium having instructions stored thereon that, if executed by a transceiver, cause the transceiver to perform operations comprising:
communicating to a modem, via an intermediate frequency cable coupled to the transceiver, data over a first frequency range; and
receiving at the transceiver, via the intermediate frequency cable, data communicated from the modem over a second frequency range,
wherein the first frequency range and the second frequency range are separated by at least one octave; wherein the data communicated over the first frequency range is carried via a first intermediate frequency signal; and wherein the data communicated over the second frequency range is carried via a second intermediate frequency signal; and wherein communication of said first and second intermediate frequency signals, over the intermediate frequency cable, is full duplex.

* * * * *